(12) United States Patent
Mevissen et al.

(10) Patent No.: US 10,382,579 B2
(45) Date of Patent: Aug. 13, 2019

(54) PERSONALIZED LOCATION-BASED SERVICES FOR USERS

(71) Applicant: International Business Machines Corporation, Armonk, NY (US)

(72) Inventors: Martin Mevissen, Dublin (IE); Eleni Pratsini, Zurich (CH); Giovanni Russo, Dublin (IE); Robert Shorten, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/444,839

(22) Filed: Feb. 28, 2017

(65) Prior Publication Data

US 2018/0249299 A1 Aug. 30, 2018

(51) Int. Cl.
*H04L 29/08* (2006.01)
*G06K 9/00* (2006.01)
*G06Q 10/06* (2012.01)
*G06Q 30/02* (2012.01)
*H04W 4/02* (2018.01)
(Continued)

(52) U.S. Cl.
CPC ........ *H04L 67/306* (2013.01); *G06K 9/00771* (2013.01); *G06Q 10/0637* (2013.01); *G06Q 30/0261* (2013.01); *H04W 4/02* (2013.01); *H04W 4/33* (2018.02); *H04L 67/12* (2013.01); *H04W 4/70* (2018.02)

(58) Field of Classification Search
CPC ..... H04W 4/046; G08G 1/146; H04L 67/306; H04L 67/12

USPC .................................................... 340/932.2
See application file for complete search history.

(56) References Cited

U.S. PATENT DOCUMENTS 8,751,427 B1 * 6/2014 Mysen .................. H04L 67/306
706/46
9,076,336 B2 7/2015 Tippelhofer et al.
(Continued)

FOREIGN PATENT DOCUMENTS

CN 201984330 U 9/2011
CN 203217725 U 9/2013

OTHER PUBLICATIONS

Car Security; https://www.viper.com/smartstart/; Feb. 21, 2017; pp. 1-9.

*Primary Examiner* — Hirdepal Singh
(74) *Attorney, Agent, or Firm* — Cantor Colburn LLP; Kurt Goudy

(57) ABSTRACT

Aspects of the present invention include methods, systems and computer program products. The method includes a detecting, by a processor, a presence of a user at a location. The method further includes detecting, by the processor, a presence of one or more sensors at the location, where the one or more sensors are communicatively coupled together and to the processor. The method further includes determining, by the processor, that the user can be sensed by the one or more sensors at the location. The method further includes notifying, by the processor, the user that a selectable personalized service is available to the user at the location. The method further includes providing, by the processor, the selectable personalized service to the user at the location, where the selectable personalized service notifies the user as to an existence of any anomalies with respect to the user.

25 Claims, 5 Drawing Sheets

(51) Int. Cl.
*H04W 4/33* (2018.01)
*H04W 4/70* (2018.01)

(56) References Cited

U.S. PATENT DOCUMENTS

| | | | |
|---|---|---|---|
| 9,251,527 | B2 | 2/2016 | Shah et al. |
| 9,286,733 | B2 * | 3/2016 | Muirbrook ............. G06Q 20/20 |
| 2013/0173062 | A1 * | 7/2013 | Koenig-Richardson ..................... G06Q 10/00 700/275 |
| 2014/0244825 | A1 | 8/2014 | Cao et al. |
| 2015/0022663 | A1 * | 1/2015 | Wang .................... B60R 25/102 348/148 |
| 2015/0067845 | A1 | 3/2015 | Chari et al. |
| 2015/0138001 | A1 * | 5/2015 | Davies ................... G08G 1/149 340/932.2 |
| 2015/0310356 | A1 * | 10/2015 | Basir ...................... G08G 1/207 701/32.3 |
| 2015/0369618 | A1 * | 12/2015 | Barnard ............. H05B 37/0272 701/491 |
| 2015/0379873 | A1 * | 12/2015 | Tippelhofer ........... G08G 1/143 340/932.2 |
| 2016/0096506 | A1 * | 4/2016 | Shreve ................. B60R 25/102 348/148 |
| 2016/0178376 | A1 * | 6/2016 | Moore ............... G01C 21/3685 701/532 |
| 2017/0055112 | A1 * | 2/2017 | Westphal .............. G06F 3/0482 |
| 2017/0102918 | A1 * | 4/2017 | Gazdzinski ........ G06Q 30/0251 |

* cited by examiner

PERSONALIZED LOCATION-BASED SERVICES FOR USERS

BACKGROUND

The present invention relates in general to the provision of location-based services to users, and more specifically, to methods, systems and computer program products that provide personalized services to a user based on a current location of the user.

In the field of provision of location-based services to users, recommender-type service systems are known. Recommender-type service systems typically react to an input from a user (e.g., a question or query from a user), and then return the results of a search personalized to the location of the user and the topic of the user's question or query. That is, they "recommend" something in response to a user question or query. For example, if a user asks about relatively good restaurants in the current area of the user (e.g., based on a restaurant rating service), the recommender system typically returns to the user a list of such good restaurants in that area (e.g., within a certain specified distance of the current location of the user). The list can include informational items such as, for example, the name of each restaurant, its location, its rating, whether or not it has valet parking, etc.

However, recommender-type systems have drawbacks, which include, for example, that the system is inherently "passive" or "reactive" in that it waits for a specific question or query from a user before providing a service. Once the service is provided, the recommender service system typically waits until it receives another question or query form the user before once again reacting to the question or query.

Thus, in the field of provision of location-based services to users, there is a need for a system that is proactive in that it triggers the provision of services based on a sensed or determined location of a user within a particular environment (e.g., a parking facility), with the services being selectively provided by an appropriate one or more sensor-type objects ("active components") that are communicatively coupled together in a configuration (e.g., the Internet of Things—"IoT"), and with the services being tailored to the specific sensed or determined location of the user (e.g., personalized car security at a parking facility).

SUMMARY

According to one or more embodiments of the present invention, a computer-implemented method includes detecting, by a processor, a presence of a user at a location. The method further includes detecting, by the processor, a presence of one or more sensors at the location, where the one or more sensors are communicatively coupled together and to the processor. The method further includes determining, by the processor, that the user can be sensed by the one or more sensors at the location. The method further includes notifying, by the processor, the user that a selectable personalized service is available to the user with the user at the location. The method further includes providing, by the processor, the selectable personalized service to the user at the location, where the selectable personalized service notifies the user as to an existence of any anomalies with respect to the user. Optionally, the method further includes the selectable personalized service comprising a vehicle security service, and where the location comprises a vehicle parking facility. Other embodiments of the present invention include a system and a computer program product.

Advantages of embodiments of the present invention include that they provide the user with a selectable personalized service for the user based on a determination of the user at a location and based on a determination that the user can be sensed at the location. In addition, other optional embodiments of the present invention are advantageous in that the selectable personalized service comprises a vehicle security service, and the location comprises a vehicle parking facility.

Additional features and advantages are realized through the techniques of the present invention. Such additional features and advantages as well as other embodiments and aspects of the invention are considered a part of the claimed invention. The subject matter which is regarded as the invention is particularly pointed out and distinctly claimed in the claims at the conclusion of the specification.

BRIEF DESCRIPTION OF THE DRAWINGS

The foregoing and other features, and advantages of the invention are apparent from the following detailed description taken in conjunction with the accompanying drawings in which.

DETAILED DESCRIPTION

Figure 1:
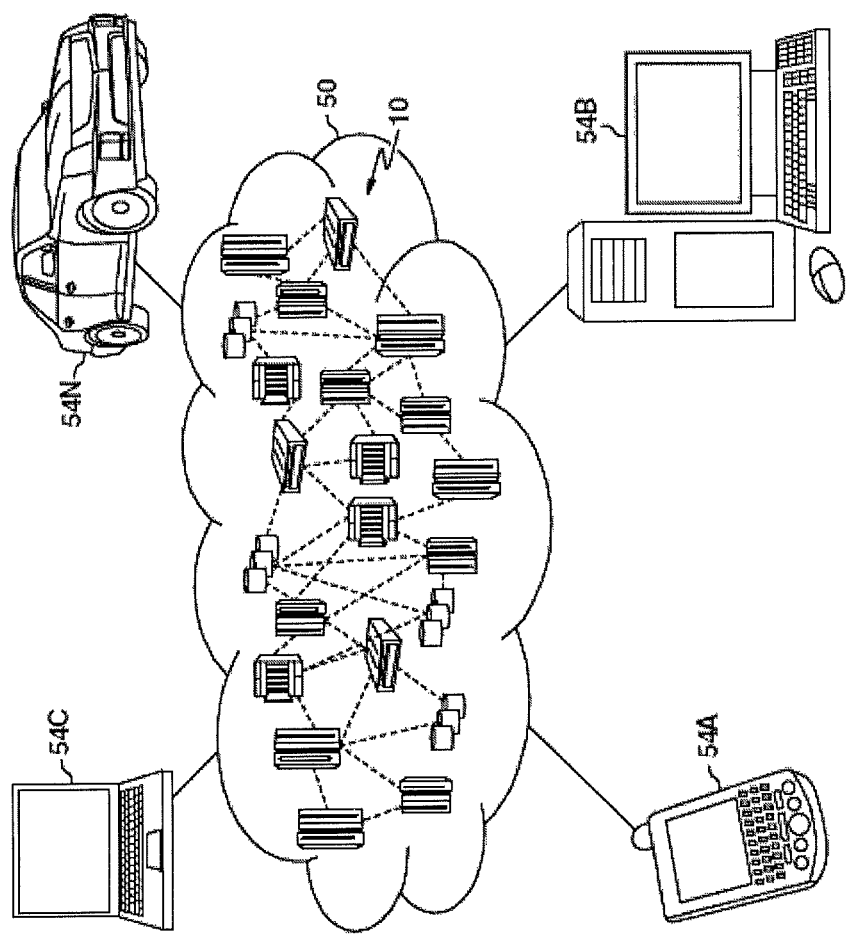
FIG. 1 depicts a cloud computing environment according to one or more embodiments of the present invention.

It is understood in advance that although this detailed description includes a description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
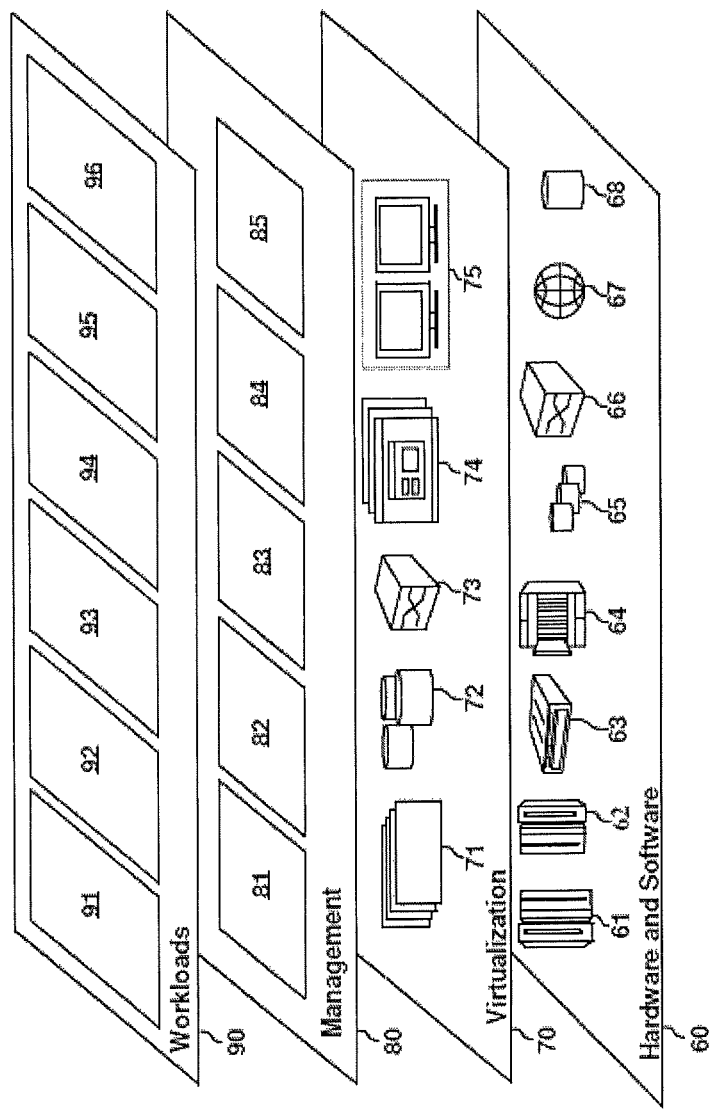
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a method 96 for providing personalized car security for a user in accordance with one or more embodiments of the present invention.

Turning now to an overview of aspects of the present invention, methods, systems, and computer program products are described for implementing a personal automobile (car) security system for a user. In embodiments of the present invention, a processor detects a presence of a user at a location. In embodiments of the present invention, the processor detects a presence of one or more sensors at the location, where the one or more sensors are communicatively coupled together and to the processor. In embodiments of the present invention, the processor determines that the user can be sensed by the one or more sensors at the location. In embodiments of the present invention, the processor notifies the user that a selectable personalized service is available to the user with the user at the location. In embodiments of the present invention, the processor provides the selectable personalized service to the user with the user at the location, where the selectable personalized service notifies the user as to an existence of any anomalies with respect to the user. Embodiments of the present invention are advantageous in that they provide the user with a selectable personalized service for the user based on a determination of the user at a location and based on a determination that the user can be sensed at the location. Other optional embodiments of the present invention are advantageous in that the selectable personalized service comprises a vehicle security service, and the location comprises a vehicle parking facility.

Embodiments of the present invention provide a personalized service to a user of the service based on a sensed or determined current location of a user and through user environment monitoring and control. More specifically, embodiments of the present invention have the advantages of improving upon known vehicle parking facilities, for example, by sensing or determining a user location within a parking facility and providing, in response to the sensed/determined user location within the parking facility, a service, or a set of multiple related services within the overall service (e.g., a car security service), to the user that the user can choose to utilize some or all of the subset of services (e.g., for a fee). In an embodiment, a plurality of cameras and/or other devices and/or objects are communicatively coupled together to offer a personalized service to a user who is at a certain specific location (e.g., a parking facility). Embodiments allow parking facilities to suggest personalized services to users for enhanced personalized security of the user's car to thereby allow the user to purchase and/or select such services for use going forward for a period of time.

Figure 3:
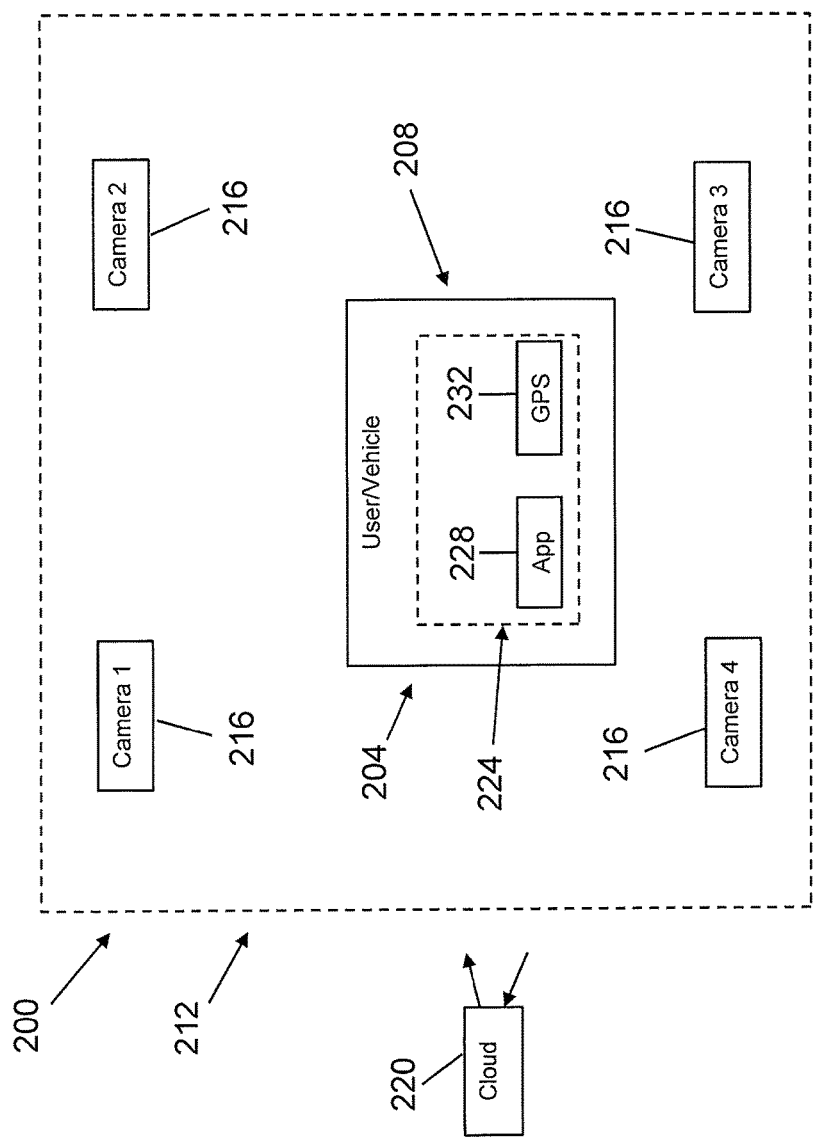
FIG. 3 is a block diagram of a system for providing personalized car security for a user of the system according to one or more embodiments of the present invention.

Referring now to FIG. 3, there is shown a block diagram of a system 200 for providing a personalized automobile (car) security service for a user 204 of the system 200, according to an embodiment of the present invention. As shown, the user 204 has a vehicle (e.g., automobile, car, truck, SUV, van) 208 that is located within the environment or property boundaries of the parking facility 212. The system 200 can include multiple such users 204 and vehicles 208.

As depicted in FIG. 3, the parking facility 212 includes one or more sensing devices and/or objects 216 which, in the embodiment of a personalized car security service, are cameras 216 (e.g., cameras 1-4). Each camera 212 can be considered to be an active device in that the camera 212 senses the presence of a user's vehicle 208 within the parking facility 212, and also senses other objects in the vicinity of the vehicle 208 within the parking facility 212 such as, for example, a human being. Other devices and/or objects besides cameras 216 can be included within the parking facility 212—for example other types of sensing devices (e.g., radio frequency identification devices—RFIDs) that can assist in providing the personalized car security system 200 of embodiments of the present invention.

Figure 4:
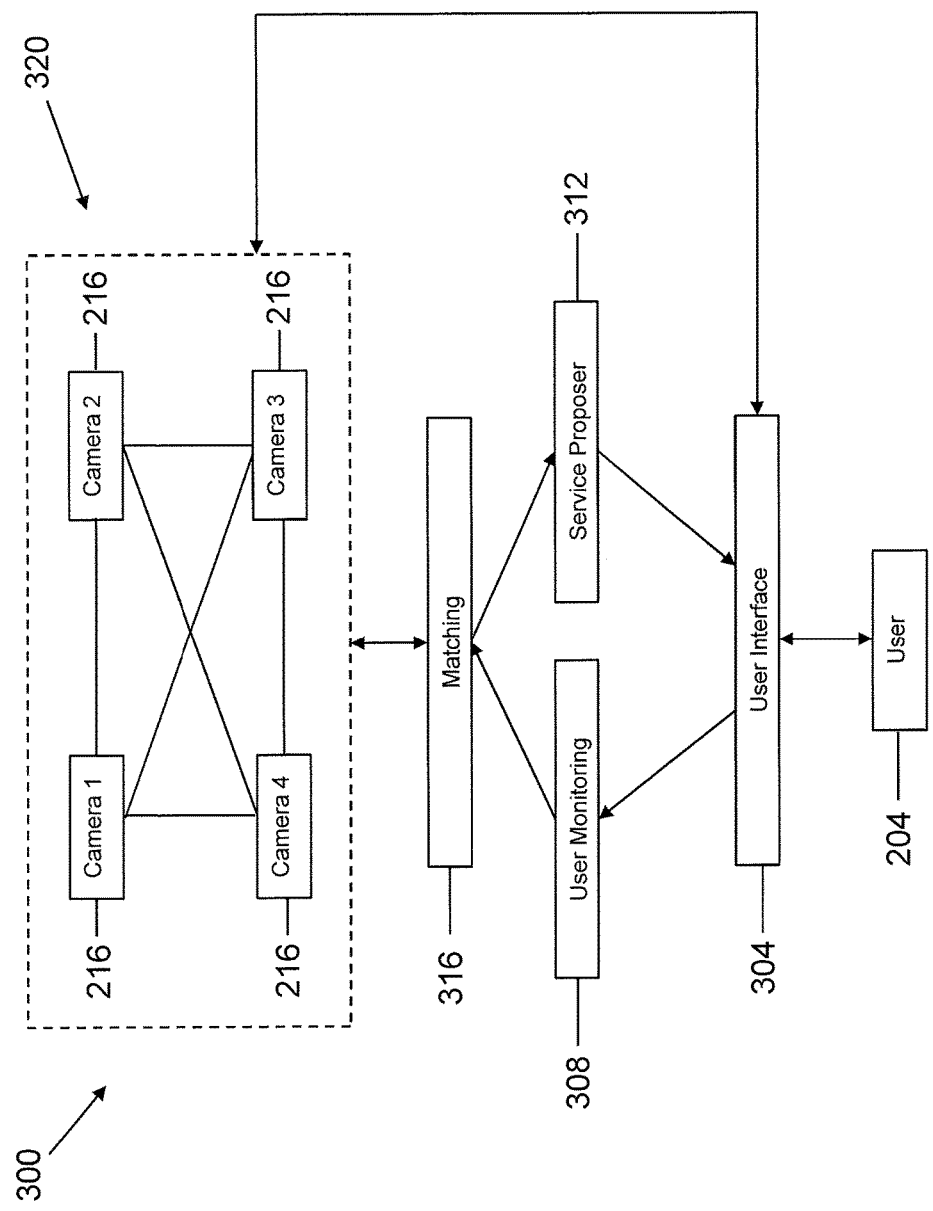
FIG. 4 is a block diagram of software modules that implement the personalized car security system of FIG. 3 according to one or more embodiments of the present invention.

The cameras 216 can be spaced at strategic locations within the parking facility 212 to allow for viewing for security purposes of the entirety of the parking facility 212, including the user's vehicle 208 and/or other vehicles within the parking facility 212. Also, the cameras 216 can be communicatively coupled together in a network configuration, such as for example, an Internet of Things ("IoT") network configuration or other type of network configuration. FIG. 4 shows in more detail an exemplary communicative coupling of the cameras 216.

In embodiments, the IoT configuration or other network configuration within the system 200 can also include or be communicatively coupled as part of or within a cloud computing environment 220, which can be similar to the cloud computing environment 50 described hereinabove with respect to FIGS. 1 and 2. As such, the cameras 216 can be nodes within the cloud computing environment 220, similar to the nodes 10 of the cloud computing environment 50 of FIGS. 1 and 2.

In embodiments, the user 204 can have in his/her possession a smartphone 224 or other computing or processing device. The smartphone 224 can include a software application program ("App") 228, which can comprise a program running on the smartphone 224 for interacting with the other components of the system 200 in accordance with embodiments of the present invention, as described in more detail hereinafter.

In an embodiment, the smartphone 224 can include a GPS navigation and location system 232, which can be used for determining the geographic location of the vehicle 208 and/or the user 204. In alternatives, the GPS system 232 can be a part of the vehicle 208, or can be a part of both the smartphone 224 and the vehicle 208. In any case, the GPS system 232, as well as the smartphone 224 and a typical computing or control system for the vehicle 208 located within the vehicle 208, can be communicatively coupled in the configuration of the system 200, within the cloud computing environment 220.

Referring now to FIG. 4, there is shown a block diagram of a software system 300 of embodiments of the present invention. The software system 300 can provide the functionality of the personalized car security system 200 of FIG. 3. In these exemplary embodiments, the software system 300 can include a number of modules. Each module can implement specific functionality for the car security system 200.

One module is a user interface module 304, which interacts or communicates with the user 204. In an embodiment, the user interface module 304 can contain a user profile, which typically contains one or more types of (pre-programmed) personal and/or other information about a particular user 204. The module 304 can also notify the user 204 of the availability of services when the user is at a certain geographic location; for example, for the personalized car security system 200 of embodiments of the present invention, when the user 204 arrives at the parking facility 212 in his/her car, as sensed/determined, for example, by the smartphone and/or car GPS system 232. Through this module 304, the user 204 can decide to accept or decline a given service, or can accept or decline one or more services within a subset of services. If the service is accepted, this module 304 can also assist in allowing a user 204 to make a transaction to buy the service or, if the service is being provided free of charge, to allow the user 204 to select the service.

Another module is a user monitoring module 308, which monitors the user 204 that enters in to the location—e.g., the parking facility 212. This module 308 also infers a relatively precise location of the user 204 and/or his/her vehicle 208 within the parking facility 212, and can also obtain the user profile from the user interface module 304. This can be performed using the cameras 216. The output of this module 308 can include an estimate or inference of what the user 204 might be interested in buying or selecting.

Yet another module is a service proposer module 312, which provides to the user interface module 304 a description of the service that is currently being proposed by the system 200 to the user 204 (e.g., personalized car security).

Still another module is a matching module 316, which can associate, for each of the users 204 in the parking facility 212, the precise position of the user 204 and/or the user's vehicle 208, the user's profile, and the available objects (cameras) 216 in the location 212. Given these inputs, the module 316 can determine a service (e.g., the personalized car security service) that might be useful to the user 204.

A device or object manager 320 is also provided. This module 320 manages the connected objects (cameras) 216 within the location 212. This module 320 also modifies the matching module 316 with the current availability of the objects 216. Also, if the service is accepted by the user 204, the object manager 320 coordinates the operation of the objects 216 (e.g., moves one or more of the cameras accordingly) to fulfil the service. In addition, the objects 216 can also be able to self-coordinate to fulfil the service. In this case, the object manager 320 can be responsible for facilitating the communication between the objects 216 and with other objects or cloud components within the system 200.

Figure 5:
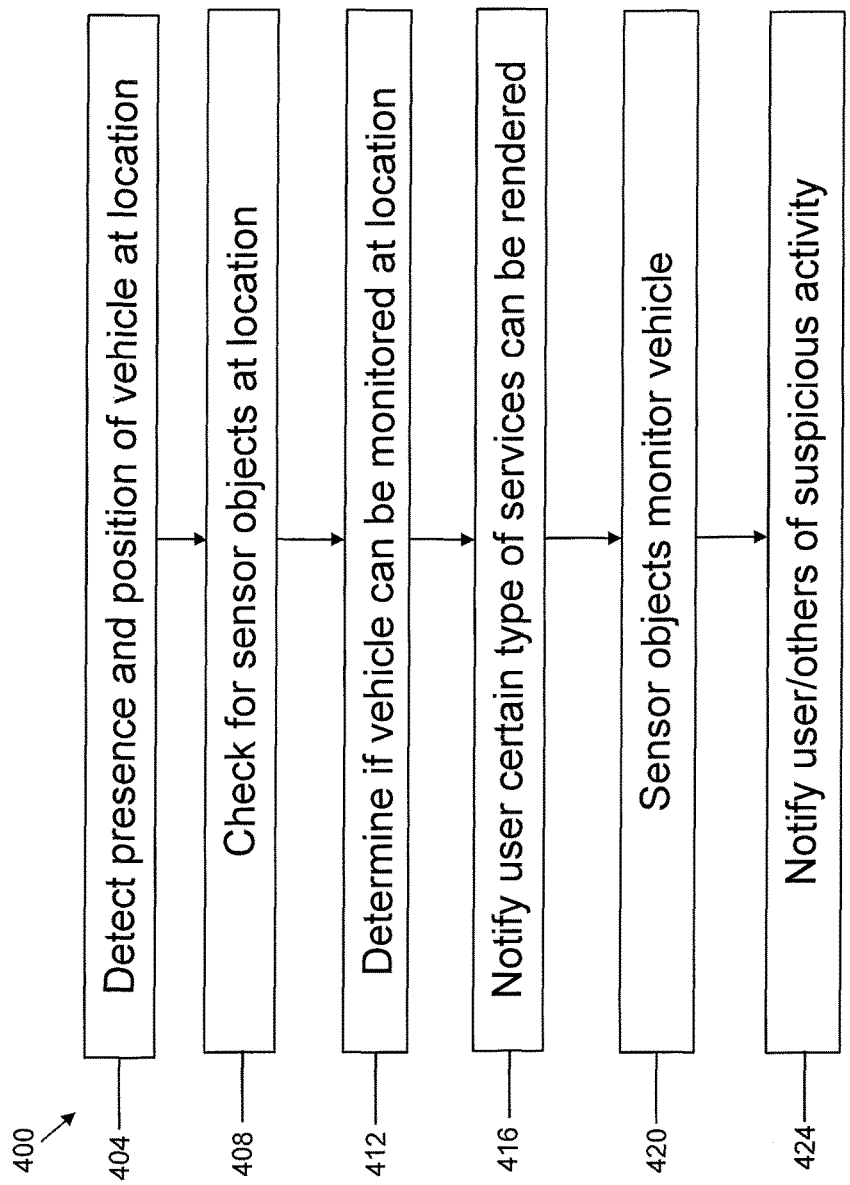
FIG. 5 is a flow diagram of a method for providing personalized car security for a user according to one or more embodiments of the present invention.

Referring now to FIG. 5, there is shown a flow diagram that illustrates a method 400 according to one or more embodiments of the present invention. In exemplary embodiments, the method 400 can be embodied in software that is executed by computer elements located at the various nodes within a network that can reside in the cloud, such as the nodes 10 within the cloud computing environment 50 described hereinabove and illustrated in FIGS. 1 and 2, or the cloud computing environment 220 of FIG. 3. Also, in embodiments, the modules 304-320 shown in FIG. 4 and described in detail hereinabove can implement a portion or all of the method 400.

The method 400 of the flow diagram of FIG. 5 is a specific example of a use case of the personalized vehicle security system 200 of FIG. 3 of embodiments of the present invention. In the method 400, an operation in block 404 detects when a user 204 drives his/her vehicle into the parking facility 212. That is, the system 200 detects the presence of a user 204 within the location 212. This can be performed by one or more of the cameras 216 and/or the GPS system 232 detecting the presence of the user's vehicle 208 within the boundaries of the parking facility 212.

As described hereinabove, the user 204 has available on his/her smartphone 224 a software application program ("App") 228 which is part of the system 200. Once the user's car 208 is parked within the parking facility 212, optionally in the operation in block 404, the App 228 can recognize or determine the exact parking location or position of the vehicle 208 within the parking facility 212 by use of, e.g., the cameras 216 and/or the GPS system 232.

In operation in block 408, a request can be broadcasted by the App 228 (e.g., to the cloud 220, FIG. 3) to check for the presence of any sensors (e.g., cameras 216) in the proximity of the car 208. The sensors 216 can reply to the broadcast request by providing, for example, their position and type (e.g., camera).

In operation in block 412, the position/type of the sensors is used by the App 228 to determine if the car 208 can be monitored by one or more of the cameras 216. That is, each camera 216 can indicate whether it can "see" or visually sense the particular user's vehicle 208 within the parking facility.

In operation in block 416, the App 228 notifies the user 204 that a location-enabled service (or set of services) is available and specifies the service (e.g., personalized vehicle monitoring through use of the cameras 216). Based on this, the user 204 can decide whether to buy this particular service.

If the user 204 buys the service, in an operation in block 420, the sensors/objects (cameras 216) monitor the car 208 for a period of time specified by the user (e.g., for as long and the user expects to have his/her parked at the facility 212). The cameras 216 can point in the direction of the car 208 and can begin to follow the movement of any people and/or other objects approaching or accessing the car 208. The cameras 216 can also verify any persistent activity in the proximity of the car 208. If the parking facility 212 is gated, any "unauthorized" movement of the vehicle 208 can cause the gate to not go up and remain closed. Also, the App 228 can trigger a live audio/video streaming to the user 204 and/or workers at the parking facility 212 in the event of any suspicious activity. The App can also provide the user 204 with the ability to contact security and/or police officers if necessary. Any suspicious activity or similar anomalies can be reported or notified to the user 204 in an operation in block 424.

Embodiments of the present invention include a method that allows a parking facility 212 to offer a personalized car security service to users who park their vehicles at the facility. The method also allows the user to be notified regarding the availability of services, and a payment method that allows a user to enroll the service. The method also provides a mobile software application program ("App") 228 located, e.g., on the user's smartphone 224, through which the user 204 can interact with the service.

Embodiments of the present invention utilize connected objects 216 within the parking facility 212, and a cloud platform 220 to exchange data/information between the parking facility 212 and a user 204 (e.g., through use of the user's smartphone 224).

In embodiments, the system 200 receives as inputs: a (pre-programmed) profile of the user; the availability of connected objects 216 at the parking facility 212; and the position of the user 204 and/or the user's car 208 within the facility 212. Based on the inputs, the system 200 matches the location of the user 204 and his/her car 208 with the available objects 216 at the parking facility 212. The objects 216 interact to actively offer their services to the user 204. The outputs of the system 200 include: based on the profile of the user, a service or a subset of services, which the user 204 can choose one or multiple personalized services; and the objects 216 are allowed to collaborate and self-coordinate accordingly to the decision of the user 204.

In embodiments, a personalized parking security system 200 includes a mobile App 228, a plurality of connected objects 216, and a user interface 304. The system 200 infers the location of the user 204 and of his/her car 208 from the mobile App 228 or the GPS system 232. The system 200 can infer the profile of the user and understand whether the user would be interested in personalized security services. Nearby objects offer their security/monitoring services to the user. The users can accept the services of all of the objects 216 or a subset of the objects 216. The objects 216 sense and act accordingly to the decision of the user 204 to provide a personalized car security service.

In embodiments, data is gathered from different sources, which are monitored and managed/controlled to allow for various interactions with users. Pervasiveness of connected devices can be an enabler and advantageous to properly deliver services to users within a location.

Embodiments of the present invention provide for real time user behavior detection. Embodiments detect user behavioral profiles and return the most optimal or appropriate service to the user. They also make users aware of available services that can be of interest to the user, and ask if the user wants to purchase the service or not. Further, pre-programmed preferences (e.g., a user profile) are provided for each particular user to which the services are tailored.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   detecting, by a processor, a user at a location, where the location comprises a vehicle parking facility; and
   wherein the vehicle parking facility comprises an egress gate for entry to and exit from the parking facility;
   detecting, by the processor, one or more sensors at the location, wherein the one or more sensors are communicatively coupled together and to the processor;
   determining, by the processor, that the user is sensed by the one or more sensors at the location;
   identifying, by the processor, a vehicle of the user based on sensor data obtained from the one or more sensors at the location;
   determining, by the processor, a parking location of the vehicle of the user based at least in part on the sensor data;
   analyzing, by the processor, the parking location to determine that the one or more sensors are able to provide one or more selectable personalized services for the vehicle in the parking location;
   responsive to determining that the one or more sensors are able to provide the one or more selectable personalized services for the vehicle in the parking location, notifying, by the processor, the user that the one or more selectable personalized services are available to the user with the user at the location, where the one or more selectable personalize services include a vehicle security service; and
   responsive to receiving a selection of at least one of the one or more selectable personalized services, providing, by the processor, the selected personalized service to the user at the location, where the selected personalized service notifies the user as to detection of any anomalies with respect to the user; and
   responsive to detecting any anomalies, providing sensor data corresponding to the any anomalies, from the one or more sensors at the location, to the user, wherein the any anomalies comprise an unauthorized movement of the vehicle of the user; and
   preventing the egress gate from opening based at least in part on the unauthorized movement of the vehicle of the user.

2. The computer-implemented method of claim 1, where the location comprises a vehicle parking facility.

3. The computer-implemented method of claim 2, where the detecting, by a processor, a presence of a user at a location further comprises detecting, by the processor, a presence of a vehicle of the user at the vehicle parking facility.

4. The computer-implemented method of claim 3, where detecting, by the processor, a presence of a vehicle of the user at the vehicle parking facility, further comprises utilizing one or more cameras located at the vehicle parking facility to visually determine a presence of a vehicle of the user at the vehicle parking facility.

5. The computer-implemented method of claim 1, where notifying, by the processor, the user that a selectable personalized service is available to the user with the user at the location, further comprises responding, by the processor, to a response from the user to select the personalized service to be provided to the user.

6. The computer-implemented method of claim 1, wherein the user, the processor, and the one or more sensors are communicatively couple together in an Internet of Things network configuration.

7. The computer-implemented method of claim 1, wherein providing, by the processor, the selectable personalized service to the user at the location further comprises utilizing, by the processor one or more inputs including a user profile.

8. The computer-implemented method of claim 1, where a processing device associated with the user allows the user to interact with the processor.

9. The computer-implemented method of claim 1, where the processor is located in a cloud computing environment, and where the method is implemented in software run by the processor located in the cloud computing environment.

10. A computer system comprising:
    a memory having program instructions stored therein;
    a processor in communication with the memory, the program instructions when executed by the processor, causing the computer system to:
       detect a user at a location, where the location comprises a vehicle parking facility; and
          wherein the vehicle parking facility comprises an egress gate for entry to and exit from the parking facility;
       detect one or more sensors at the location, where the one or more sensors are communicatively coupled together and to the processor;
       determine that the user is sensed by the one or more sensors at the location;
       identify a vehicle of the user based on sensor data obtained from the one or more sensors at the location;

determine a parking location of the vehicle of the user based at least in part on the sensor data;

analyze the parking location to determine that the one or more sensors are able to provide one or more selectable personalized services for the vehicle in the parking location;

responsive to determining that the one or more sensors are able to provide the one or more selectable personalized services for the vehicle in the parking location, notify the user that the one or more selectable personalized services are available to the user with the user at the location, where the one or more selectable personalized services include a vehicle security service; and in response to receiving a selection of at least one of the one or more selectable personalized services, provide the selected personalized service to the user at the location, where the selected personalized service notifies the user as to detection of any anomalies with respect to the user; and responsive to detecting any anomalies, providing sensor data corresponding to the any anomalies, from the one or more sensors at the location, to the user, wherein the any anomalies comprise an unauthorized movement of the vehicle of the user; and prevent the egress gate from opening based at least in part on the unauthorized movement of the vehicle of the user.

11. The computer system of claim 10, where the location comprises a vehicle parking facility.

12. The computer system of claim 11, where the program instructions causing the system to detect a presence of a user at a location further comprises the program instructions causing the system to detect a presence of a vehicle of the user at the vehicle parking facility.

13. The computer system of claim 12, where the program instructions causing the system to detect a presence of a vehicle of the user at the vehicle parking facility further comprises the program instructions causing the system to utilize one or more cameras located at the vehicle parking facility to visually determine a presence of a vehicle of the user at the vehicle parking facility.

14. The computer system of claim 10, where the program instructions causing the system to notify the user that a selectable personalized service is available to the user with the user at the location further comprises the program instructions causing the system to respond to a response from the user to select the personalized service to be provided to the user.

15. The computer system of claim 10, wherein the user, the processor, and the one or more sensors are communicatively couple together in an Internet of Things network configuration.

16. The computer system of claim 10, wherein the program instructions causing the system to provide the selectable personalized service to the user at the location further comprises the program instructions causing the system to utilize one or more inputs including a user profile.

17. The computer system of claim 10, where a processing device associated with the user allows the user to interact with the processor.

18. The computer system of claim 10, where the processor is located in a cloud computing environment, and where the program instructions are implemented in software run by the processor located in the cloud computing environment.

19. A computer program product comprising:
a non-transitory storage medium readable by a processing circuit and storing instructions for execution by the processing circuit for performing a method comprising:

detecting a user at a location, wherein the location comprises a vehicle parking facility; and wherein the vehicle parking facility comprises an egress gate for entry to and exit from the parking facility;

detecting one or more sensors at the location, where the one or more sensors are communicatively coupled together and to the processor;

determining that the user is sensed by the one or more sensors at the location;

identifying, by the processor, a vehicle of the user based on sensor data obtained from the one or more sensors at the location;

determining, by the processor, a parking location of the vehicle of the user based at least in part on the sensor data;

analyzing, by the processor, the parking location to determine that the one or more sensors are able to provide one or more selectable personalized services for the vehicle in the parking location;

responsive to determining that the one or more sensors are able to provide the one or more selectable personalized services for the vehicle in the parking location, notifying the user that the one or more selectable personalized services are available to the user with the user at the location, where the one or more selectable personalized services include a vehicle security service; and responsive to receiving a selection of at least one of the one or more selectable personalized services, providing, by the processor, the selected personalized service to the user at the location, where the selected personalized service notifies the user as to detection of any anomalies with respect to the user; and responsive to detecting any anomalies, providing sensor data corresponding to the any anomalies, from the one or more sensors at the location, to the user, wherein the any anomalies comprise an unauthorized movement of the vehicle of the user; and preventing the egress gate from opening based at least in part on the unauthorized movement of the vehicle of the user.

20. The computer program product of claim 19, where the location comprises a vehicle parking facility.

21. The computer program product of claim 20, where the detecting a presence of a user at a location further comprises detecting a presence of a vehicle of the user at the vehicle parking facility.

22. The computer program product of claim 21, where detecting a presence of a vehicle of the user at the vehicle parking facility further comprises utilizing one or more cameras located at the vehicle parking facility to visually determine a presence of a vehicle of the user at the vehicle parking facility.

23. The computer program product of claim 19, where notifying the user that a selectable personalized service is available to the user with the user at the location further comprises responding to a response from the user to select the personalized service to be provided to the user.

24. The computer program product of claim 19, where a processing device associated with the user allows the user to interact with the processor.

25. The computer program product of claim 19, where the processing circuit is located in a cloud computing environment, and where the program instructions are implemented in software run by the processing circuit located in the cloud computing environment.

* * * * *